United States Patent
Kang

(10) Patent No.: US 9,143,200 B2
(45) Date of Patent: Sep. 22, 2015

(54) APPARATUS AND METHOD OF RECEIVER ARCHITECTURE AND LOW-COMPLEXITY DECODER FOR LINE-CODED AND AMPLITUDE-MODULATED SIGNAL

(71) Applicant: QUALCOMM Incorporated, San Diego, CA (US)

(72) Inventor: Eunmo Kang, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 92 days.

(21) Appl. No.: 13/786,709

(22) Filed: Mar. 6, 2013

(65) Prior Publication Data

US 2014/0086347 A1  Mar. 27, 2014

Related U.S. Application Data

(60) Provisional application No. 61/705,905, filed on Sep. 26, 2012.

(51) Int. Cl.
*H04B 5/00* (2006.01)
*H04L 25/06* (2006.01)
*H04L 25/49* (2006.01)
*H04L 27/08* (2006.01)
*H04B 1/06* (2006.01)
*H04B 10/60* (2013.01)

(52) U.S. Cl.
CPC .......... *H04B 5/0025* (2013.01); *H04B 5/0031* (2013.01); *H04L 25/06* (2013.01); *H04L 25/4904* (2013.01); *H04L 27/08* (2013.01); *H04B 1/06* (2013.01); *H04B 5/0062* (2013.01); *H04B 10/60* (2013.01)

(58) Field of Classification Search
CPC .. H04B 5/0025; H04B 5/0062; H04B 5/0031; H04B 10/60; H04B 1/06; H04L 25/06; H04L 25/4904; H04L 27/08; H03M 1/0854

USPC ........ 375/243, 245, 247, 254, 285, 316, 319, 375/346, 377; 341/126

See application file for complete search history.

(56) References Cited

U.S. PATENT DOCUMENTS

| 5,127,023 | A | 6/1992 | Tash et al. | |
|---|---|---|---|---|
| 6,556,239 | B1* | 4/2003 | Al-Araji et al. | 348/192 |
| 6,876,698 | B1* | 4/2005 | Dick et al. | 375/229 |

(Continued)

FOREIGN PATENT DOCUMENTS

EP  1701499 A2  9/2006

OTHER PUBLICATIONS

International Search Report and Written Opinion—PCT/US2013/061342—ISA/EPO—Nov. 21, 2013.
Kim, et al., "A Design of Transceiver for 13.56 MHz RFID Reader using the Peak Detector with Automatic Reference Voltage Generator and Voltage Limiter", SoC Design Conference (ISOCC) International, 2010, pp. 287-289.

(Continued)

*Primary Examiner* — Jean B Corrielus
(74) *Attorney, Agent, or Firm* — Kevin T. Cheatham

(57) ABSTRACT

In some examples, the receiver apparatus includes a receiver interface configured to receive a signal from a transmitter and output an input sequence of M-bit samples. The apparatus may also include a quantizer circuit configured to convert the input sequence of M-bit samples into an output sequence of N-bit samples, wherein M and N are positive integer numbers, and wherein M is greater than N. The apparatus may further include a decoder circuit configured to decode the output sequence of N-bit samples.

24 Claims, 15 Drawing Sheets

(56) References Cited

U.S. PATENT DOCUMENTS

| | | |
|---|---|---|
| 7,890,080 B2 | 2/2011 | Wu et al. |
| 7,928,867 B2 * | 4/2011 | Straeussnigg et al. ......... 341/77 |
| 2006/0068710 A1 * | 3/2006 | Jensen .................... 455/63.1 |
| 2007/0124139 A1 * | 5/2007 | Chen ....................... 704/219 |
| 2007/0126584 A1 | 6/2007 | Hyde et al. |
| 2008/0284630 A1 * | 11/2008 | Kikugawa et al. ............ 341/155 |
| 2010/0091688 A1 | 4/2010 | Staszewski et al. |
| 2011/0050475 A1 * | 3/2011 | Straeussnigg et al. ........ 341/155 |
| 2011/0301477 A1 | 12/2011 | Hughes |
| 2012/0083205 A1 | 4/2012 | Marcu et al. |
| 2012/0214416 A1 | 8/2012 | Kent et al. |
| 2012/0309325 A1 * | 12/2012 | Carbone et al. ................ 455/73 |

OTHER PUBLICATIONS

ISO/IEC 18092 Information technology—Telecommunications and information exchange between systems—Near Field Communication—Interface and Protocol (NFCIP-1), First edition Apr. 1, 2004, 66 pages.

ISO/IEC, "Identification cards-Contactless integrated circuit cards-Proximity cards, Part 3: Initialization and anticollision", Second edition Apr. 15, 2011, 70 pgs.

NFC Forum, "NFC Digital Protocol", NFCForum-TS-Digital Protocol-1.0, Nov. 2010, 194 pages.

* cited by examiner

APPARATUS AND METHOD OF RECEIVER ARCHITECTURE AND LOW-COMPLEXITY DECODER FOR LINE-CODED AND AMPLITUDE-MODULATED SIGNAL

RELATED APPLICATIONS

This application claims priority to and the benefit of Provisional Application No. 61/705,905 filed on Sep. 26, 2012 in the U.S. Patent and Trademark Office, the entire contents of which are incorporated herein by reference.

BACKGROUND

1. Field

The described technology generally relates to an apparatus and method of wireless communication and radio frequency identification. More particularly, the technology relates to a receiver design and optimization for wireless near field communication.

2. Description of the Related Technology

The wireless communication environment in a home or an office generally includes a number of independently developed radio access technologies and standards. These technologies were initially designed for target applications and they perform relatively well for these applications. In a typical home or office environment, an access to content (e.g., web, video, etc.) is provided to a broadband modem through the home-owner's IP backhaul connection. For instance, mobile services are provided through the cellular network, through either a macro cell or a femto cell located within the home or office. Wireless local area network (WLAN) access points (APs) provide data connectivity between computers, cell phones, laptops, printers, and other wireless stations using 802.11-based Wi-Fi technology.

Another communication medium currently being implemented in electronic equipment is near field communication (NFC). The use of NFC interfaces in electronic equipment provides portable devices with functions similar to those of non-contact integrated circuit cards (e.g., radio frequency identification (RFID) cards). In addition, electronic equipment provided with NFC interfaces is typically capable of operating as radio frequency (RF) readers and/or writers to communicate with other NFC devices. A basic aspect of NFC is an usage of electromagnetic waves in an RF range and a transmission of information contents is realized over a short distance only, for instance in a range of about several centimeters.

RFID technology is widely used in many areas such as public traffic services, object tracking systems and home management, and it is growing rapidly. It can handle the information from tags. The RFID application technology is currently integrated in one chip. 13.56 MHz RFID reader specification is based on the standard including ISO 14443 type A, type B, ISO 15693 and ISO 18000-3 standards. In NFC or an RFID application, a transmitter of a proximity coupling device (PCD), also known as a reader, writer or initiator, may use one of following three linear codes, followed by an amplitude modulation: (1) a modified-Miller code used for type A NFC, (2) a non-return-to-zero (NRZ) code used in type B NFC, and (3) a Manchester code used in type F NFC.

SUMMARY

Various implementations of systems, methods and devices within the scope of the appended claims each have several aspects, no single one of which is solely responsible for the desirable attributes described herein. Without limiting the scope of the appended claims, some prominent features are described herein.

One aspect is a receiver apparatus, including a receiver interface configured to receive a signal from a transmitter and output an input sequence of M-bit samples; a quantizer circuit configured to convert the input sequence of M-bit samples into an output sequence of N-bit samples, wherein M and N are positive integer numbers, and wherein M is greater than N; and a decoder circuit configured to decode the output sequence of N-bit samples.

Another aspect is a method of processing a signal in a receiver apparatus, including receiving a signal from a transmitter and outputting an input sequence of M-bit samples; converting the input sequence of M-bit samples into an output sequence of N-bit samples, wherein M and N are positive integer numbers, and wherein M is greater than N; and decoding the output sequence of N-bit samples.

Another aspect is one or more processor-readable storage devices having processor-readable code embodied on the processor-readable storage devices, the processor-readable code for programming one or more processors to perform a method of processing a signal in a receiver apparatus, the method including receiving a signal from a transmitter and outputting an input sequence of M-bit samples; converting the input sequence of M-bit samples into an output sequence of N-bit samples, wherein M and N are positive integer numbers, and wherein M is greater than N; and decoding the output sequence of N-bit samples.

Another aspect is a receiver apparatus, including means for receiving a signal from a transmitter and outputting an input sequence of M-bit samples; means for converting the input sequence of M-bit samples into an output sequence of N-bit samples, wherein M and N are positive integer numbers, and wherein M is greater than N; and means for decoding the output sequence of N-bit samples.

Another aspect is a processing apparatus, including a memory and a processor coupled to the memory, the processor configured to receive a signal from a transmitter and output an input sequence of M-bit samples, convert the input sequence of M-bit samples into an output sequence of N-bit samples, and decode the output sequence of N-bit samples. The M and N may be positive integer numbers, and M is greater than N.

Details of one or more implementations of the subject matter described in this specification are set forth in the accompanying drawings and the description below. Other features, aspects, and advantages become apparent from the description, the drawings, and the claims. Note that the relative dimensions of the following figures may not be drawn to scale.

Figure 1:
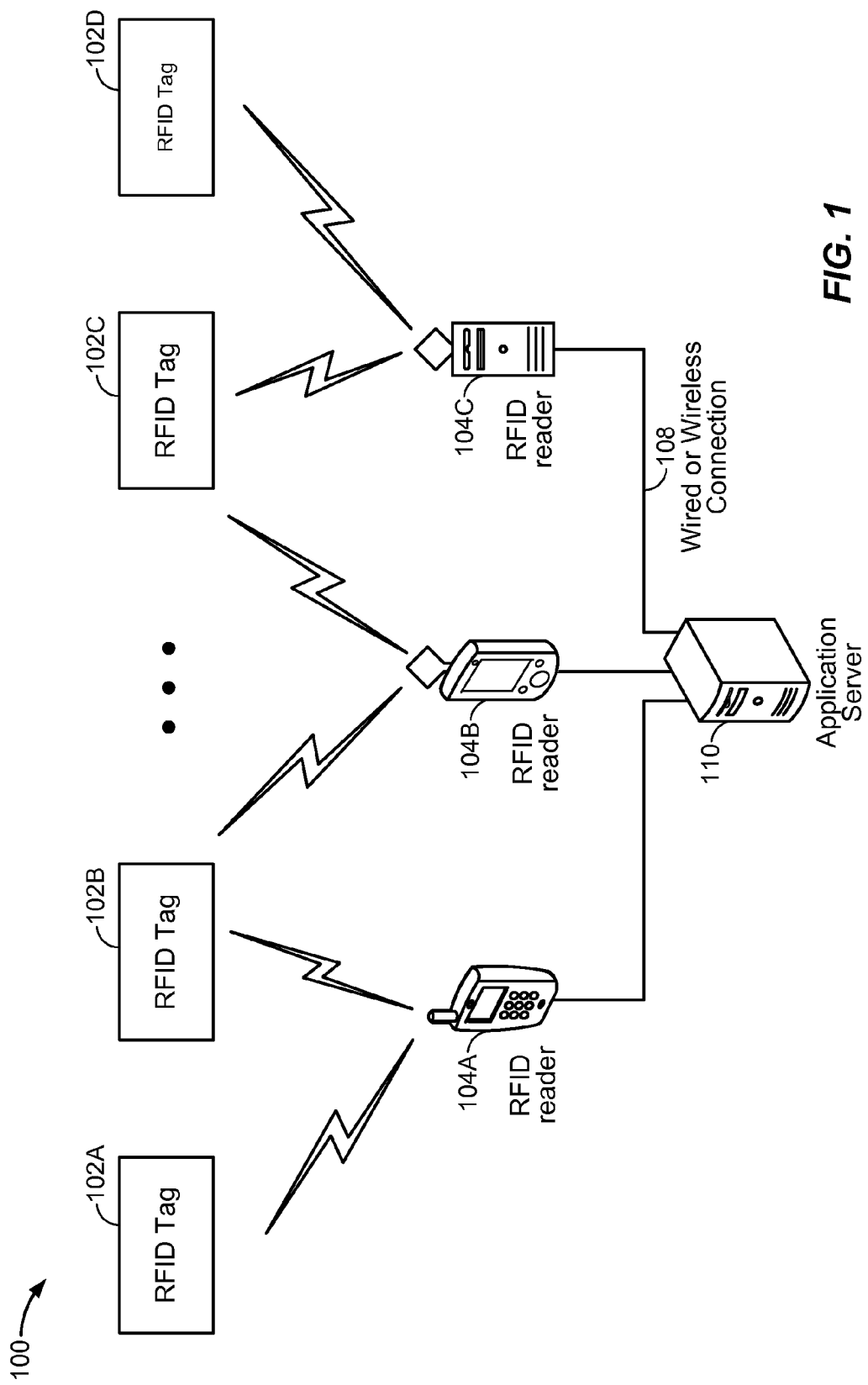
FIG. 1 illustrates an exemplary block diagram of an RFID or NFC system.

The various features illustrated in the drawings may not be drawn to scale. Accordingly, the dimensions of the various features may be arbitrarily expanded or reduced for clarity. In addition, some of the drawings may not depict all of the components of a given system, method or device. Finally, like reference numerals may be used to denote like features throughout the specification and figures.

DETAILED DESCRIPTION

The detailed description set forth below in connection with the appended drawings is intended as a description of exemplary implementations of the disclosure and is not intended to represent the only implementations in which the disclosure may be practiced. The term "exemplary" used throughout this description means "serving as an example, instance, or illustration," and should not necessarily be construed as preferred or advantageous over other exemplary implementations. The detailed description includes specific details for the purpose of providing a thorough understanding of the exemplary implementations of the disclosure. In some instances, some devices are shown in block diagram form.

While for purposes of simplicity of explanation, the methodologies are shown and described as a series of acts, it is to be understood and appreciated that the methodologies are not limited by the order of acts, as some acts may, in accordance with one or more aspects, occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with one or more aspects.

FIG. 1 illustrates an exemplary block diagram of an RFID or NFC system 100. The RFID system 100 includes a plurality of RFID tags 102A-102D, a plurality of RFID readers 104A-104C and an application server 110. The RFID tags 102A-102D may each be associated with a particular object for a variety of purposes including, but not limited to, tracking inventory, tracking status, location determination and assembly progress. The RFID tags 102A-102D may be active devices that include internal power sources or passive devices that derive power from the RFID readers 104A-104C. Although FIG. 1 shows only four RFID tags and three RFID readers, the present disclosure is not limited thereto.

Each RFID reader 104A-104C wirelessly communicates data with one or more RFID tags 102A-102D within its coverage area. For example, the RFID tags 102A and 102B may be within a coverage area of the RFID reader 104A, the RFID tags 102B and 102C may be within a coverage area of the RFID reader 104B, and the RFID tags 102C and 102D may be within a coverage area of the RFID reader 104C. In one embodiment, the RF communication mechanism between the RFID readers 104A-104C and the RFID tags 102A-102D is a backscatter technique. In this embodiment, the RFID readers 104A-104C request data from the RFID tags 102A-102D via an RF signal, and the RF tags 102A-102D respond with the requested data by modulating and backscattering the RF signal provided by the RFID readers 104A-104C.

In another embodiment, the RF communication mechanism is an inductance technique whereby the RFID readers 104A-104C magnetically couple to the RFID tags 102A-102D via an RF signal to access the data on the RFID tags 102A-102D. In either embodiment, the RFID tags 102A-102D provide the requested data to the RFID readers 104A-104C on the same RF carrier frequency as the RF signal.

In this manner, the RFID readers 104A-104C collect data from each of the RFID tags 102A-102D within its coverage area. The collected data is then conveyed to the application server 110 via a wired or wireless connection 108 and/or via possible communication mechanism, for example, a peer-to-peer communication connection. In addition, and/or in the alternative, the application server 110 may provide data to one or more of the RFID tags 102A-102D via the associated RFID readers 104A-104C. Such downloaded information is application dependent and may vary greatly. Upon receiving the downloaded data, the RFID tag can store the data in a non-volatile memory therein.

In another embodiment, the RFID readers 104A-104C may optionally communicate data on a peer-to-peer basis such that each RFID reader does not need a separate wired or wireless connection 108 to the application server 110. For example, the RFID reader 104A and the RFID reader 104B may communicate on a peer-to-peer basis utilizing a back scatter technique, a WLAN technique, and/or any other wireless communication technique. In this instance, the RFID reader 104B may not include a wired or wireless connection 108 to the application server 110. In embodiments in which communications between the RFID reader 104A-104C and the application server 110 are conveyed through the wired or wireless connection 108, the wired or wireless connection 108 may utilize any one of a plurality of wired standards (e.g., Ethernet and fire wire) and/or wireless communication standards (e.g., IEEE 802.11x and Bluetooth).

As one of ordinary skill in the art will appreciate, the RFID system of FIG. 1 may be expanded to include a multitude of RFID readers 104A-104C distributed throughout a desired location (for example, a building or office site) where the RFID tags may be associated with equipment, inventory and/or personnel. In addition, it should be noted that the application server 110 may be coupled to another server and/or network connection to provide wide area network coverage.

Figure 2:
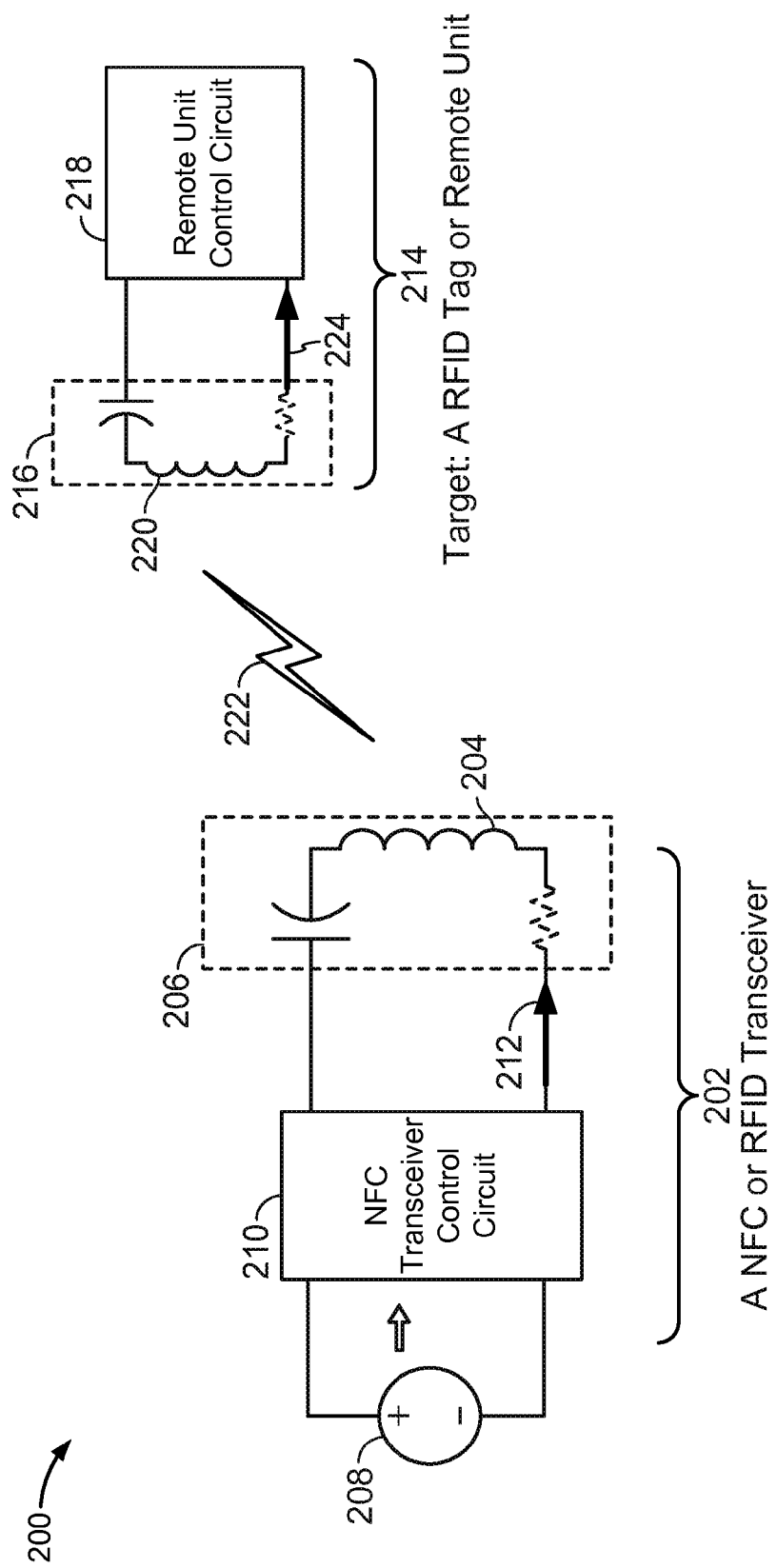
FIG. 2 illustrates an exemplary schematic block diagram of an RFID or NFC system including a transceiver and a remote unit.

FIG. 2 illustrates an exemplary schematic block diagram of an RFID or NFC system 200 including a transceiver and a remote unit. The RFID system 200 includes an RFID transceiver 202 and a remote unit 214 such as an RFID tag. The RFID transceiver 202 may include a voltage power source 208, an NFC transceiver control circuit 210 and a transmitter circuit 206. The NFC transceiver control circuit 210 is powered by the voltage source 208, and connected to one or more transceiver loops 204. The transceiver loops 204 are hereinafter interchangeably used with coils or loop antennae. The coils and loop antenna may be made of conductive material, for example, an electromagnetic coil, through which an alternating current (AC) 212 can flow. The transceiver loops 204 may be circular, oval, and the like, although other sizes and shapes are possible. The AC current 212 flowing through the transceiver loops 204 can result in transmitting magnetic energy or magnetic flux 222 at various frequencies (e.g., about 100 kHz to about 20 MHz). The wavelength of the emitted frequencies may be much longer than the size of loops 204 on the RFID transceiver 202.

The remote unit 214 includes a receiver circuit 216 and a remote unit control circuit 218. If the remote unit 214 is close enough to the RFID transceiver 202, the magnetic flux 222 from the transceiver 202 can get AC coupled onto one or more remote unit loops 220 of conductive material, which can be an unpowered device (i.e., without a battery or other means of applying continuous power) having the electromagnetic coil and remote unit control circuit 218. An oscillating AC current 224 flowing in alternating directions in the remote unit control circuit 218 can be rectified by a rectifying diode in the remote unit control circuit 218, which can cause a voltage to be built up across a bypass capacitor in the remote unit control circuit 218. Once the bypass capacitor has built up a sufficient voltage, the remote unit control circuit 218 can become powered up and operational. By receiving coupled and modulated AC signal from the RFID transceiver 202, the remote unit 218 can receive and detect information (e.g., commands) from the RFID transceiver 202.

Once operational, the remote control circuit 218 may also send signals back to the RFID transceiver 202 by changing the impedance seen by the remote unit loops 220. This can be accomplished by shunting or opening the remote unit loops 220 with, for example, a switch. If the remote unit 214 is close enough to the RFID transceiver 202, the modulated electromagnetic field generated by the remote unit loops 220 in the remote unit 214 can be coupled back onto the reader loops 204 of the RFID transceiver 202. The signals sent back to the RFID transceiver 202 can be slow and on the order of 100 bits of data, and provide information back to the transceiver 202 such as the serial number or model number of the device to which the remote unit 214 is attached, credit card number, personal identification information, security codes and passwords, and the like.

Figure 3:
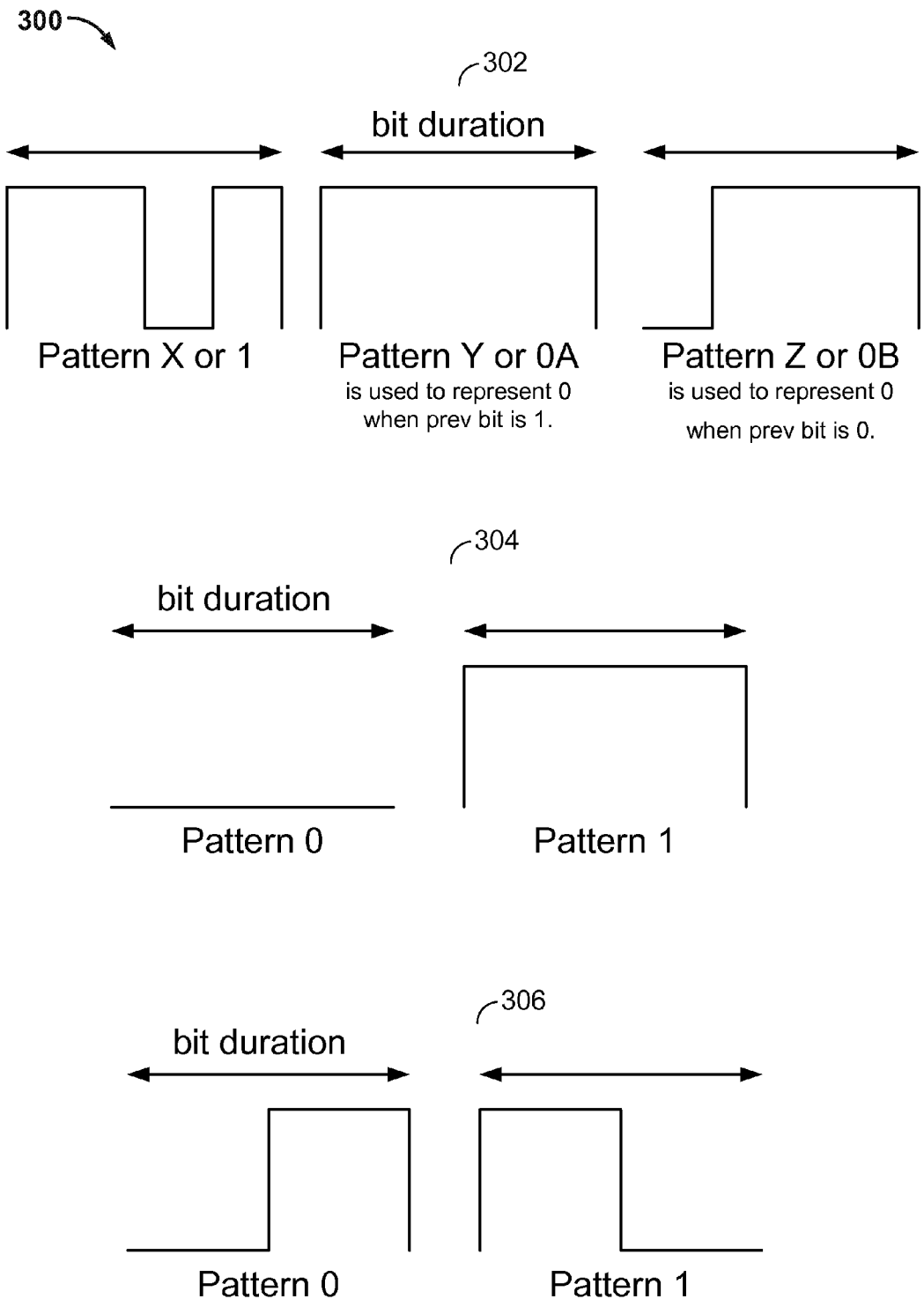
FIG. 3 illustrates an exemplary diagram of a modified-Miller code pattern, an NRZ code pattern and a Manchester code pattern.

FIG. 3 illustrates an exemplary diagram of a modified-Miller code pattern, an NRZ code pattern and a Manchester code pattern. NRZ and Manchester codes are relatively straightforward compared to a modified-Miller code. Three waveform patterns are illustrated in FIG. 3. Waveform pattern 302 represents a modified-Miller code for Type A. Waveform pattern 304 represents an NRZ code for Type B. Waveform pattern 306 represents a Manchester code for Type F. Pattern 1 is generally used to represent bit 1. The pattern for bit 0 is either pattern 0A or 0B, depending on the previous bit. If the previous bit is 1, then pattern 0A is used to transmit bit 0; otherwise, pattern 0B is used.

The NFC protocol poses a few unique challenges to wireless communication. First, the signal amplitude of NFC may be severely distorted by an RF subsystem. This is because the signal dynamic range of NFC may be relatively large at a receive antenna. As such, a conventional automatic gain control (AGC) may not perform well for NFC. Second, a Type B NFC signal may contain a long sequence of high level (or low level) values, which makes the traditional DC offset cancellation technique impracticable or unworkable.

One embodiment extracts signal amplitude in the RF subsystem and feeds it to an analog-to-digital converter (ADC), followed by the acquisition block and decoder block operating on multi-bit ADC output samples. The decoder block could be implemented by applying a plurality of matched filters (e.g., two matched filters, one for Pattern 0 and the other for Pattern 1, when decoding Manchester-coded signal) to ADC output after removing direct current (DC) components. Another embodiment performs slicing in the RF subsystem and runs the acquisition block and decoder block on a single-bit slicer output. The decoder block could be implemented using binary matched filtering (meaning input and filter coefficients are binary symbols).

Figure 4:
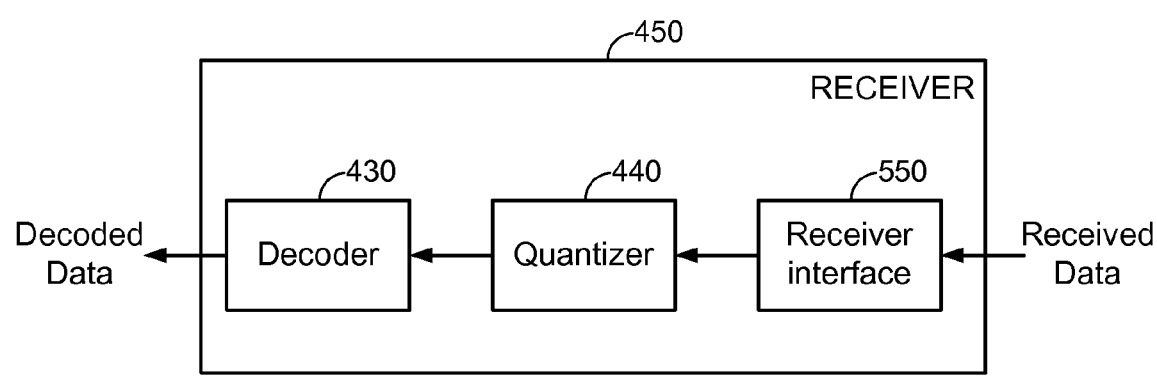
FIG. 4 illustrates an exemplary receiver structure of an NFC system according to one embodiment.

FIG. 4 illustrates an exemplary receiver structure of an NFC system according to one embodiment. In one embodiment, the receiver 450 includes a receiver interface 550, a quantizer 440 and a decoder 430. At least one of the receiver interface 550, the quantizer 440 and the decoder 430 can be realized as software (e.g., modules) or hardware (e.g., circuit). The receiver interface 550 receives a signal from a transmitter (not shown) and outputs an input sequence of M-bit samples. The receiver interface 550 may include at least one of the multiple elements (418-424) as shown in FIG. 5.

The quantizer 440 converts the input sequence of M-bit samples into an output sequence of N-bit samples. The quantizer 440 may remove a time-varying DC component from the input sequence. The quantizer 440 may be realized as an adaptive slicer 426 shown in FIG. 5. In one embodiment, M and N are positive integer numbers, and M is greater than N. For example, M may be 3 or greater, and N may be 2 or 1. The decoder 430 decodes the output sequence. In some embodiments, the decoder 430 includes a line-code decoder. The line-code decoder may be, for example, at least one of the followings: a modified-Miller code decoder, an NRZ code decoder and a Manchester code decoder.

Figure 5:
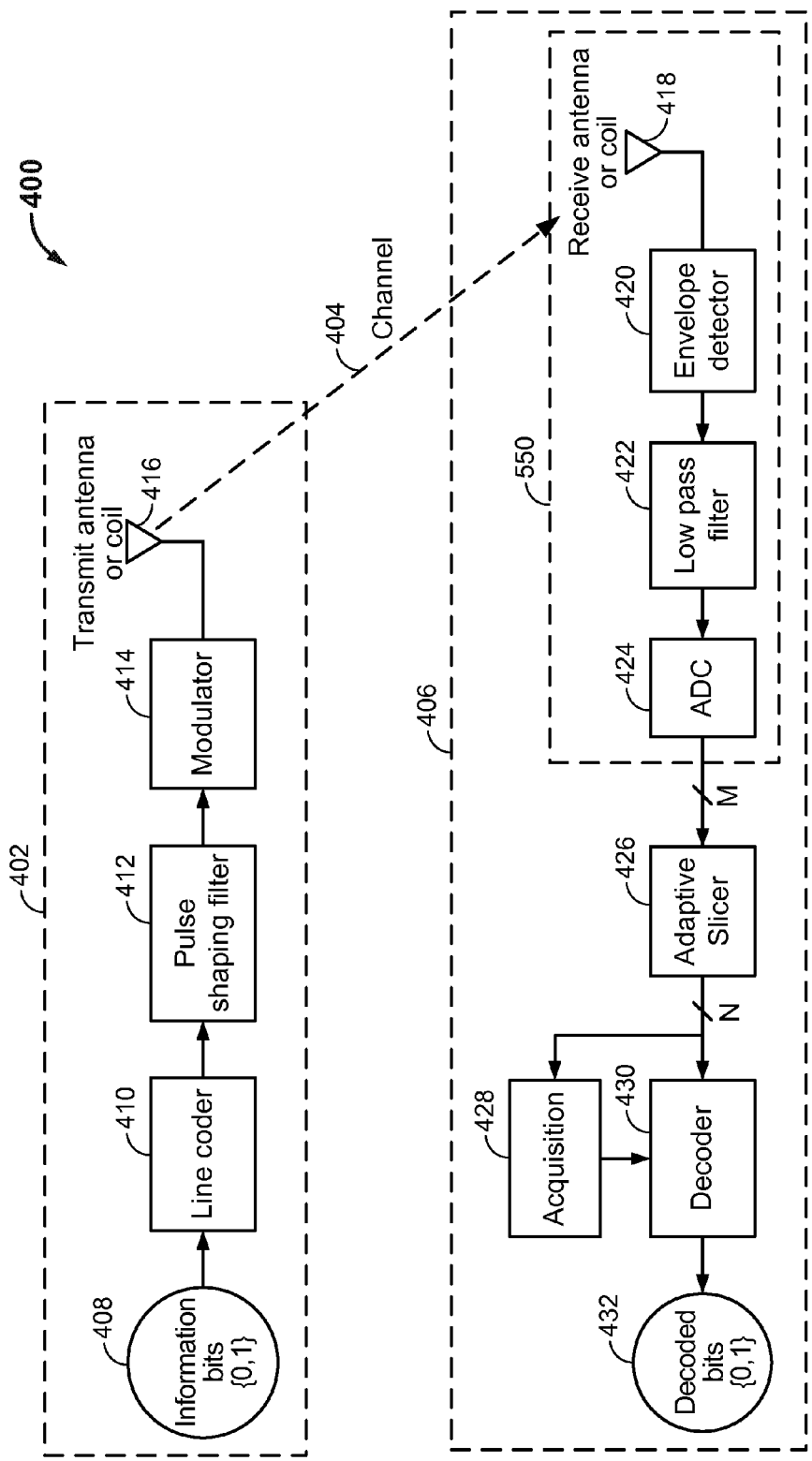
FIG. 5 illustrates an exemplary detailed structure of the NFC system according to one embodiment.

FIG. 5 illustrates an exemplary detailed structure of an NFC system 400 according to one embodiment. In one implementation, the NFC system 400 includes a transmitter 402 and a receiver 406. Between the transmitter 402 and the receiver 406, there is a channel 404. On the transmitter side, an information source 408 generates information bits (0, 1) and sends the information bits to a line coder 410. The line coder 410 may code the information bits and generate corresponding coded bits using an encoding mechanism, such as an NRZ coding mechanism, a Manchester coding mechanism and a modified-Miller coding mechanism. The coded bits are then sent into a pulse shaping filter (PSF) 412. The PSF 412 generates a signal pulse or symbol for one or multiple coded bits. The modulator 414 modulates the signal symbols generated by the PSF 412. The transmit antenna 416 transmits the modulated signal symbols to the receiver 406 through the channel 404. The transmit antenna 416 may include a coil.

In one implementation, the receiver 406 includes a receive antenna 418, an envelope detector 420, a low pass filter (LPF) 422, an ADC 424, the adaptive slicer 426, an acquisition module 428, the decoder 430 and an information bit sink 432. Depending on the embodiment, certain elements/blocks may be removed from or additional elements/blocks may be added to the system 400 illustrated in FIG. 5. Furthermore, two or more elements/blocks may be combined into a single element/block, or a single element/block may be realized as multiple elements/blocks. For example, the antenna 418, the envelope detector 420, the LPF 422 and ADC 424 can be realized as a single element such as the receiver interface 550. Furthermore, at least one of the adaptive slicer 426 and the acquisition module 428 may be incorporated into the decoder 430.

The receive antenna 418 receives the modulated symbols sent by the transmitter 402 through the channel 404. The receive antenna 418 may include a coil. In one implementation, the envelope detector 420 is located in a front portion of the receiver 406 signal processing process flow. The envelope detector 420 may carry out demodulation of the modulated symbols received by the receiver antenna 418 and generate demodulated symbols. The demodulated symbols are sent into the LPF 422. The LPF 422 may reduce carrier signal ripples and high frequency noise from the demodulated symbols. The carrier signal ripples may be made by a carrier which carries the modulated symbols and may cause bit errors on the decoder 430. The demodulated symbols filtered by the LPF 422 are sent into the ADC 424.

In one implementation, the ADC 424 is a multi-bit ADC and generates multi-bit output samples. In another implementation, the ADC 424 is a 1-bit ADC and generates 1-bit output per sample. The output samples generated by the ADC 424 are sent into the adaptive slicer 426. In one implementation, the adaptive slicer includes a digital multiplexer. The adaptive slicer 426 generates a bit stream. The adaptive slicer 426 may convert the input sequence of M-bit samples into the output sequence of N-bit samples and remove a time-varying DC component from the input sequence (M and N are positive integer numbers). In one embodiment, the adaptive slicer 426 may convert an input sequence of at least 3-bit samples into an output sequence of 1-bit samples. In this embodiment, the adaptive slicer 426 maps the output sequence of multi-bit samples into binary symbols. In another embodiment, the adaptive slicer 426 may convert an input sequence of at least 3-bit samples into an output sequence of 2-bit samples.

Figure 8:
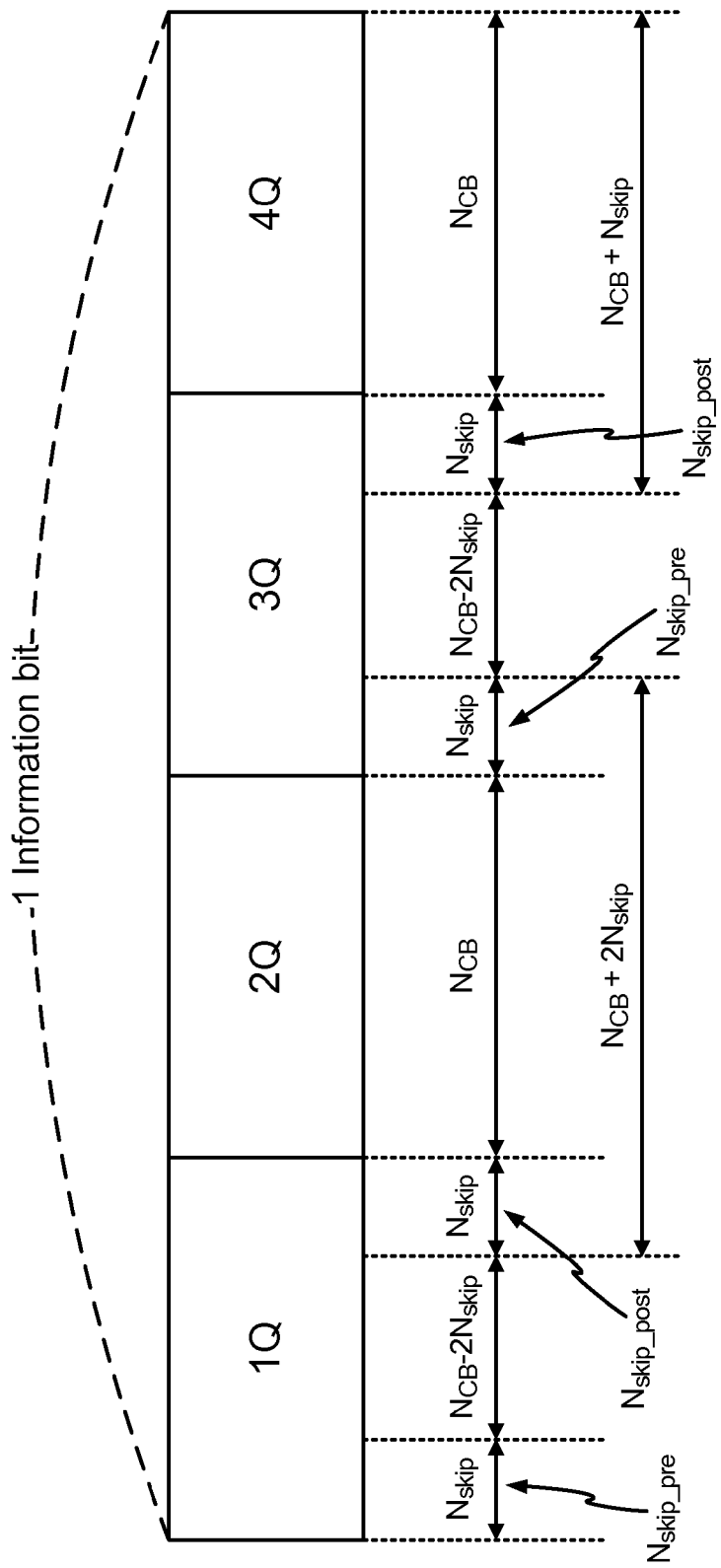
FIG. 8 illustrates an exemplary data format of an input data sequence where some coded samples are selected and the remaining samples are skipped.

The bit stream from the adaptive slicer 426 is sent into the acquisition block 428 and the decoder 430. The acquisition block 428 acquires packets and symbol timing (i.e., bit boundary information) from the bit stream. The bit boundary may be located between neighboring quarters of a bit stream (e.g., the last quarter of an information bit and the first quarter of the subsequent information bit) for the modified Miller code, and between neighboring halves of a bit stream for the Manchester code. The bit boundary may also be located between neighboring quarters of the same raw bit. In some embodiments, bit samples are skipped at signal transition points, e.g., the boundary of the quarters for the modified Miller code as shown in FIG. 8. In one implementation, the symbol timing is a series of boundaries. The decoder 430 decodes information bits from the output from the adaptive slicer 426 and sends the decoded information bits to the sink 432. Since the acquisition block 428 and the decoder block 430 operate on binary symbols or symbols whose bit-width is at most two, they can be implemented with low hardware complexity, compared with the blocks operating on multi-bit ADC outputs (e.g., a 3-bit ADC or higher resolution ADCs).

Figure 6:
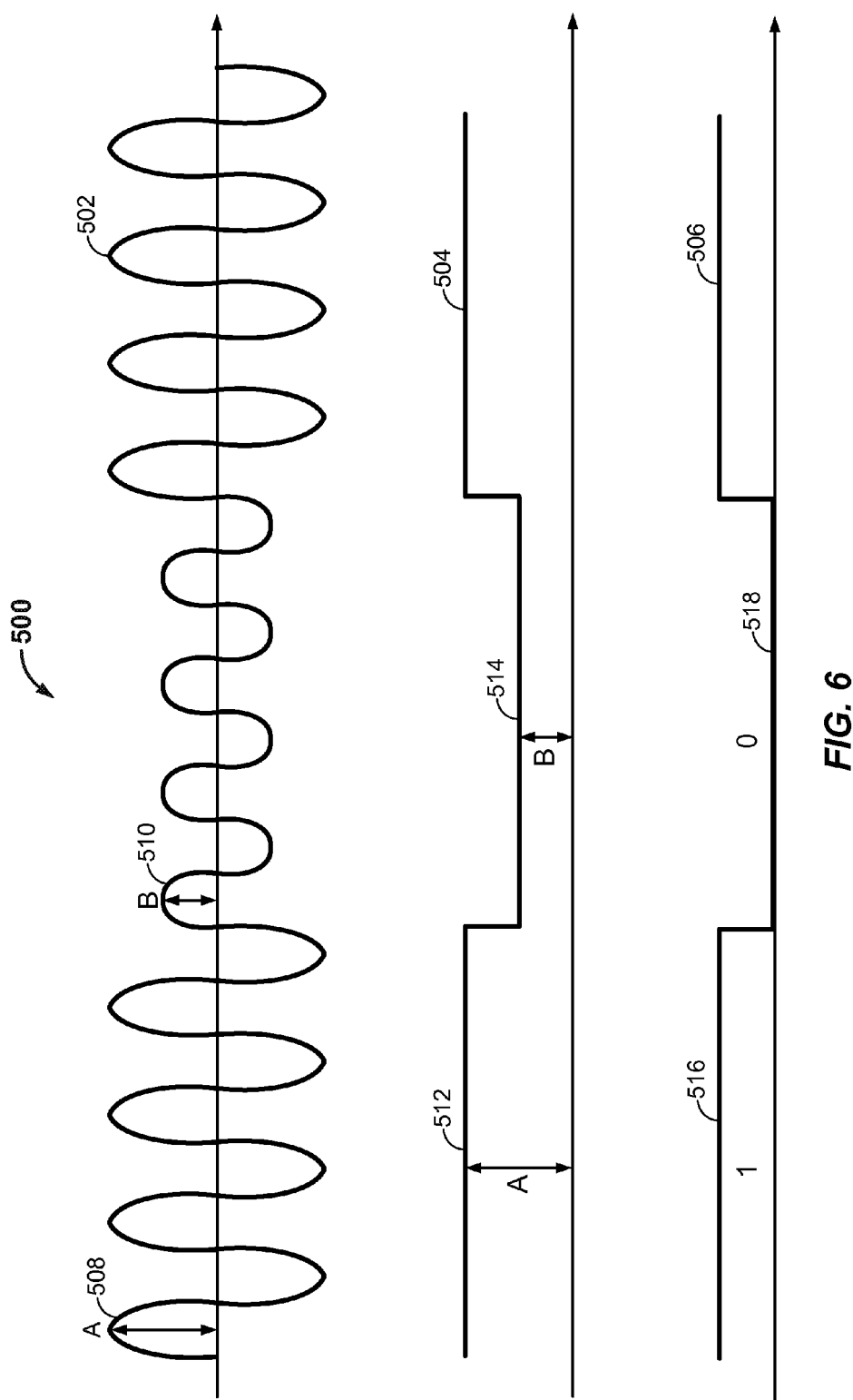
FIG. 6 illustrates examples of signal waveforms that are being processed inside an NFC receiver.

FIG. 6 illustrates examples of signal waveforms that are being processed inside the NFC receiver 406 of FIG. 5. The signal waveforms include a received passband signal wave 502, an envelope detector output signal waveform 504, and an adaptive slicer output signal waveform 506. The signal waveform 502 may indicate the received modulated symbols received and outputted by the receive antenna 418. As shown in FIG. 6, the signal waveform 502 includes at least two symbols: the high amplitude symbol 508 and low amplitude symbol 510. The signal waveform 504 is the corresponding output from the envelope detector 420 as shown in FIG. 5. The signal waveform 504 includes at least two demodulated symbols 512 and 514 corresponding to the symbols 508 and 510, respectively. The signal waveform 506 denotes the corresponding output from the adaptive slicer 426. The signal waveform 506 includes at least two symbols (or bits) 516 and 518 corresponding to the symbols 512 and 514, respectively. The signal waveform 506 is sent to both the acquisition module 428 and the decoder 430.

In one implementation, the decoder 430 may be more easily implemented, if an unknown and time-varying DC component in the input signals has been removed by the adaptive slicer 426, and an input sample is a binary symbol. In Equation 1 below, $x[k]$, $k=0, 1, \ldots, N_B-1$, denotes slicer output samples for one bit duration. $a[k]$ and $b[k]$ denote two ideal slicer output sequences corresponding to bit 0 and bit 1, respectively. These two output sequences may be line coder output sequences generated from the line coder 410. $p[k]$ represents the probability of error at an index k. Then, the log likelihood ratio (LLR) can be written as $$\log\left(\frac{P(\{x[k]\} \mid \text{bit } 1)}{P(\{x[k]\} \mid \text{bit } 0)}\right) = \log\left(\frac{\prod_{k \in B}(1-p[k])\prod_{k \in B'}p[k]}{\prod_{k \in A}(1-p[k])\prod_{k \in A'}p[k]}\right) \quad (1)$$

where $A=\{k|x[k]=a[k]\}$, $A'=\{k|x[k]\neq a[k]\}$, $B=\{k|x[k]=b[k]\}$ and $B'=\{k|x[k]\neq b[k]\}$. The above Equation 1 yields three observations. The first observation is that any slicer output sample $x[k]$ for which $a[k]=b[k]$ is irrelevant from a LLR point of view. The second observation is if $p[k]$ is close to 50%, the corresponding $x[k]$ does not affect LLR. The third observation is, assuming $p[k]$ is a constant $p<0.5$ for all k, LLR reduces to $$\log\left(\frac{P(\{x[k]\} \mid \text{bit } 1)}{P(\{x[k]\} \mid \text{bit } 0)}\right) = (|B|-|A|)\log(1-p) + (|B'|-|A'|)\log(p) \quad (2)$$

which is simplified as:

$$(|B|-|A|)\log\left(\frac{1-p}{p}\right) \quad (3)$$

Here $|A|$ and $|B|$ denote the number of entries in the set A and set B, respectively. Equations 2 and 3 illustrate that an optimal decoding rule given binary input samples is to declare bit 1 if $|B|>|A|$, or equivalently, if a number of slicer output samples that match the ideal bit 1 sequence exceeds another number of slicer output samples that match the ideal bit 0 sequence. Equation 2 and 3 also show that segments where bit 0 and bit 1 have the same line-code output can be ignored in decoding.

One embodiment considers a case where $p[k]$ is not a constant because in reality $p[k]$ is not a constant. From this point on, the sample indices $\{k|a[k]=b[k]\}$ are also ignored, which makes A and B disjoint sets, and $A=B'$ and $A'=B$. Then, Equation 1 reduces to $$\log\left(\frac{P(\{x[k]\} \mid \text{bit } 1)}{P(\{x[k]\} \mid \text{bit } 0)}\right) = \log\left(\prod_{k \in A}\frac{p[k]}{1-p[k]}\right)\log\left(\prod_{k \in B}\frac{1-p[k]}{p[k]}\right) \quad (4)$$

$$= \sum_{k \in B}\log\left(\frac{1-p[k]}{p[k]}\right) - \sum_{k \in A}\log\left(\frac{1-p[k]}{p[k]}\right)$$

Equation 4 shows that a weighted sum is a decision statistics for a maximum-likelihood decoder.

However, in order to reduce hardware complexity, one embodiment ignores real valued weighting factors, denoted by log terms as shown in Equation 4. Instead, the above embodiment uses only 0 and 1 as a quantized weighting factor in a decoder design as shown in Equation 5 below.

$$\log\left(\frac{P(\{x[k]\} \mid \text{bit } 1)}{P(\{x[k]\} \mid \text{bit } 0)}\right) = \sum_{k \in B} Q\left[\log\left(\frac{1-p[k]}{p[k]}\right)\right] - \sum_{k \in A} Q\left[\log\left(\frac{1-p[k]}{p[k]}\right)\right] \quad (5)$$

where $x[k]$, $k=0, 1, \ldots, N_B-1$, denotes the slicer output sequence, $p[k]$ represents the probability of error at an index $k$, $A=\{k|x[k]=a[k]\}$, $B=\{k|x[k]=b[k]\}$, $a[k]$ and $b[k]$ denote two ideal slicer output sequences corresponding to bit 0 and bit 1, respectively, and Q [Y] means a quantized value (0 or 1) of Y. Equation 5 is much simpler than Equation 4 above, because Q[Y] is 0 or 1. Thus, Equation 5 can substantially simplify the hardware design of the decoder 430. Equation 5 also provides a decent level of decoding accuracy, since simulations show that performance loss due to this simplification is insignificant.

Figure 7:
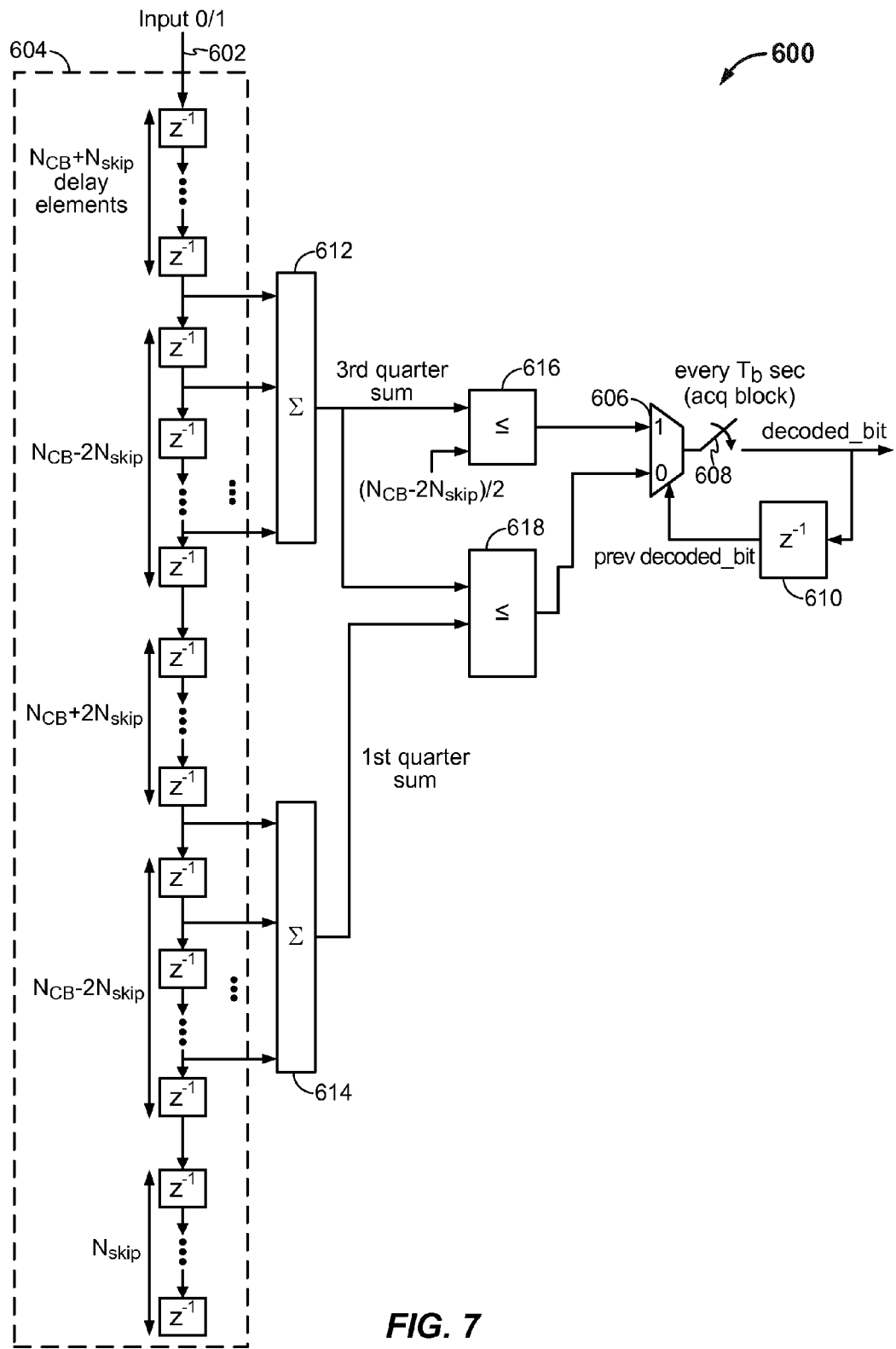
FIG. 7 illustrates a block diagram of a modified-Miller code decoder according to one embodiment.

Next, type-specific decoding processes based on these observations are described below. FIG. 7 illustrates a block diagram of a modified-Miller code decoder according to one embodiment. In FIG. 7, certain elements/blocks may be removed from or additional elements/blocks may be added to the decoder 600 illustrated in FIG. 7. Furthermore, two or more elements/blocks may be combined into a single element/block, or a single element/block may be realized as multiple elements/blocks. This applies to the embodiments of FIGS. 9-13.

For a modified-Miller code, a decoding rule generally depends on a previous decoded bit. For example, if the previous decoded bit is 1, then it decides between pattern 1 and 0A. Further, the modified-Miller code decoder may count the number of 1's in a third quarter and compare the count against half the number of samples per a quarter of a bit duration. If the previous decoded bit is 0, then it decides between pattern 1 and 0B. The modified-Miller code decoder may compare the number of 1's in the first quarter and the number in the third quarter.

The adaptive slicer 426 of FIG. 5 may output a first group of samples at the beginning and at the end of each quarter period, and a second group of samples in the middle of each quarter period. The first group of samples may be more erroneous than the second group of samples. In some embodiments, the first group of samples are skipped, whose number of samples are denoted by $N_{skip}$ in FIGS. 7 and 8, during decoding.

The modified-Miller code decoder 600 may include a delay line 604 and first and second sum blocks 612 and 614, first and second comparators 616 and 618, a decision block 606, an output interface 608 and a delay block 610. In one embodiment, an input stream 602 to a modified-Miller decoder 600 is binary (i.e., single bit). In another embodiment, an input steam is a two-bit sequence. For the purpose of convenience, the description will be made mainly based on a single bit sequence input to the decoder 600. This applies to the remaining embodiments. The input stream 602 goes down through the delay line 604.

FIG. 8 illustrates an exemplary data format of an input data sequence where some samples are selected and the remaining samples are skipped. In FIGS. 7 and 8, $N_{CB}$ represents the number of decoder input samples in one raw bit. For example, denoting the number of decoder input samples per information bit by $N_B$, $N_B=4N_{CB}$ for the modified Miller code, $N_B=N_{CB}$ for the NRZ code, and $N_B=2N_{CB}$ for the Manchester code. In one embodiment, as shown in FIG. 8, one information bit includes four quarters (1Q-4Q) for the modified Miller code. FIGS. 7 and 8 show five groups of decoder input samples, which are listed starting from the bottom of the delay line 604 as follows: $N_{skip}$, $N_{CB}-2N_{skip}$, $N_{CB}+2N_{skip}$, $N_{CB}-2N_{skip}$ and $N_{CB}+N_{skip}$. In some embodiments, out of the five groups, only the second and fourth groups ($N_{CB}-2N_{skip}$) are used in decoding and the other three are skipped and not used in decoding. In this embodiment, the samples ($N_{CB}$) of each of the second quarter (2Q) and the fourth quarter (4Q) are skipped (not used in decoding). In addition, the beginning and end portions ($N_{skip}$) of each of the first and third quarters (1Q, 3Q) are skipped. Consequently, the middle portions ($N_{CB}-2N_{skip}$) of each of the first and third quarters are selected and used in decoding.

In one embodiment, each quarter has eight samples. In this embodiment, the number of $N_{skip}$ may be 1, 2 or 3. For example, if the number of $N_{skip}$ is 3, the number of samples ($N_{CB}-2N_{skip}$) that are selected and decoded is 2 in each of the first and third quarters (1Q, 3Q).

Each of the sum blocks 612 and 614 sums the number of samples as described above. The first comparator 616 compares the output of the first sum block 612 and a reference value, and outputs one (1) if the former is smaller than or equal to (or greater than, depending on the embodiment) the latter (the reference value) and zero (0) otherwise. The reference value may be $(N_{CB}-2N_{skip})/2$. If the number of $N_{skip}$ is 3 and the number of $N_{CB}$ is 8, the reference value is 1. The second comparator 618 compares the output of the first sum block 612 and the output of the second sum block 614, and outputs one (1) if the former is smaller than or equal to (or greater than, depending on the embodiment) the latter (the output of the second sum block 614) and zero (0) otherwise. The decision block 606 selects one of the two inputs based on a selection signal such as the previous decoded bit output from the delay block 610. The decision block 606 may include a multiplexer.

The output interface 608 provides the decoded bit to the delay block 610 while outputting the decoded bit. The output interface 608 may include a switch. The switch may be closed while decoding, and opened while bit samples are filling the delay line 604. When the switch 620 is closed, the decoded bit is output. The switch 620 may be repeatedly closed and opened every $T_b$ second. $T_b$ may be, for example, about 9.4 micro seconds if data rate is about 106 kbps.

Figure 9:
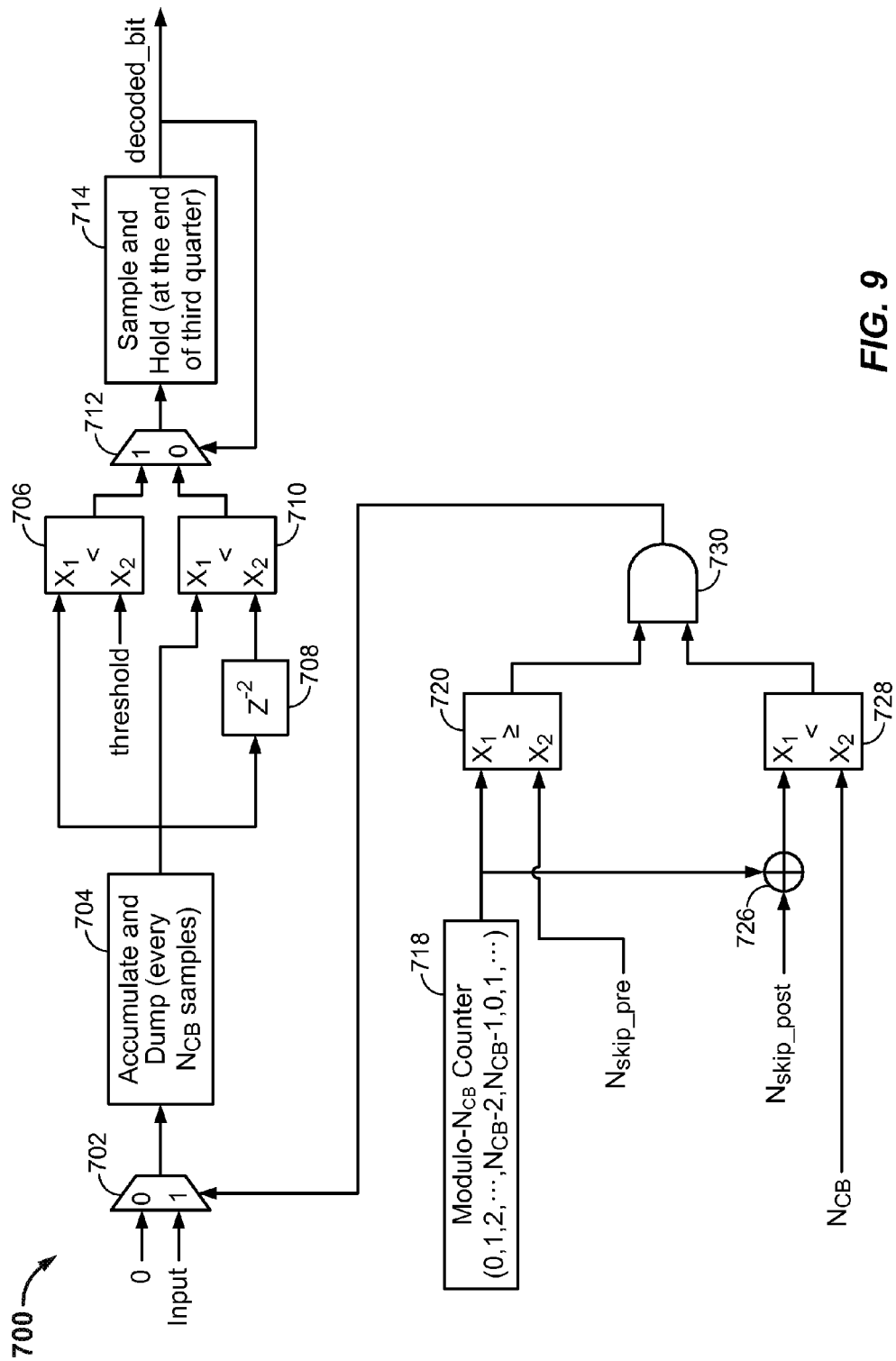
FIG. 9 illustrates a block diagram of a modified-Miller code decoder according to another embodiment.

FIG. 9 illustrates a block diagram of a modified-Miller code decoder according to another embodiment. The modified-Miller decoder 700 may be more hardware-efficient than the modified-Miller decoder 600 of FIG. 7, since the decoder 700 does not include a delay line. In this embodiment, the decoder 700 decodes bit samples as they arrive. In one embodiment, the decoder 700 includes a first multiplexer 702, an accumulate-and-dump block 704, a delay block 708, comparators 706 and 710, a second multiplexer 712 and a sample-and-hold block 714. The decoder 700 may also include a modulo-$N_{CB}$ counter 718, comparators 720 and 728, an adder 726 and a logic gate 730.

The first multiplexer 702 receives two inputs (0 and decoder input sample sequence) and outputs one of the two based on a selection signal received from the logic gate 730. If the selection signal is zero, then the multiplexer 702 outputs zero (0) and the decoder input sample is ignored (i.e., skipped). The accumulate-and-dump block 704 may accumulate and dump the output of the multiplexer 702. For example, the accumulate-and-dump block 704 may output one sample every quarter of a bit duration. The output of the accumulateand-dump block 704 is provided to the inputs ($X_1$) of the comparators 706 and 710. The comparator 706 receives the output of the accumulate-and-dump block 704 and a threshold value (e.g., ($N_{CB}-2N_{skip}$)/2) and may output a binary symbol indicating which one of the two input signals is smaller. The delay block 708 delays the output of the accumulate-and-dump block 704. The comparator 710 receives the output of the accumulate-and-dump block 704 and the output of the delay block 708, and may output a binary symbol indicating which one of the two input signals is smaller. The second multiplexer 712 receives the outputs of the comparators 706 and 710 and outputs one of the two inputs based on a selection signal received from the sample-and-hold block 714. The sample-and-hold block 714 may latch the output of the second multiplexer 712 at the end of the third quarter of a bit duration, and output a decoded bit.

The modulo-$N_{CB}$ counter 718 counts the number of decoder input samples received during each quarter of a bit duration. In one embodiment, the count is incremented each time an input sample arrives and at the beginning of each quarter of a bit duration, the count is reset to zero (0).

The comparator 720 may receive the outputs of the modulo-$N_{CB}$ counter 718 and $N_{skip\_pre}$ (see FIG. 8) and output a binary symbol, one (1) if the sample count is no less than (or no greater than, depending on embodiment) $N_{skip\_pre}$ and zero (0) otherwise. The adder 726 may add the outputs of the modulo-$N_{CB}$ counter 718 and $N_{skip\_post}$. The comparator 728 may receive the output of the adder 726 and $N_{CB}$, and output a binary symbol, one (1) if the sample count is less than (or greater than, depending on embodiment) $N_{CB}$ and zero (0) otherwise. The logic gate 730 receives the outputs of the comparators 720 and 728 and performs a logic operation on the received inputs. The logic gate 730 may be an AND gate. The output of the logic gate 730 is used as the selection signal for the first multiplexer 702, indicating whether an input sample needs to be used in decoding or skipped.

Figure 10:
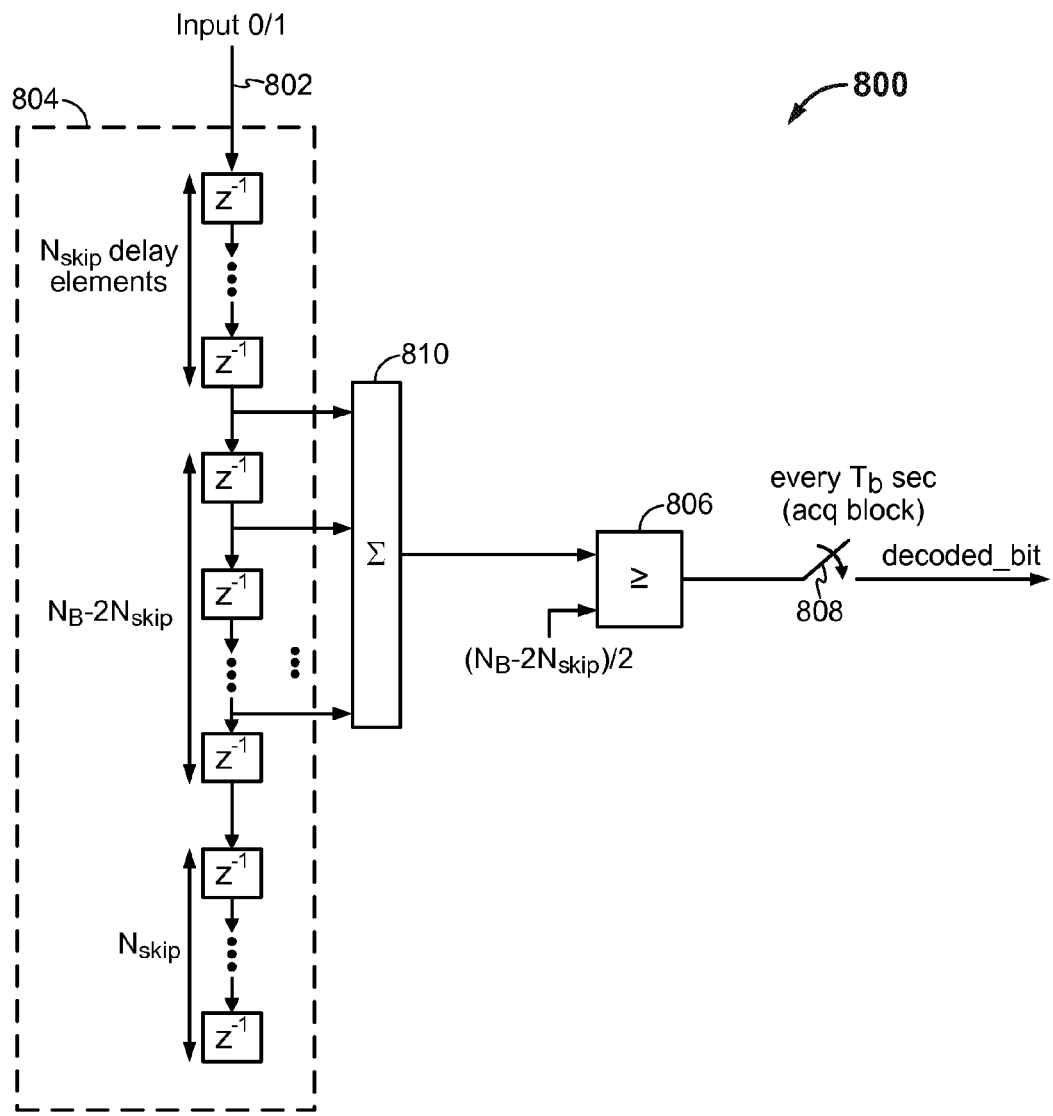
FIG. 10 illustrates a block diagram of an NRZ code decoder according to one embodiment.

FIG. 10 illustrates a block diagram of an NRZ code decoder 800 according to one embodiment. In some embodiments, the slicer output sequence for bit 0 is all zeros, while that for bit 1 is all ones. In these embodiments, the NRZ decoder 800 counts the number of 1's in the samples after discarding the initial $N_{skip}$ and the last $N_{skip}$ samples. If the number exceeds ($N_B-2N_{skip}$)/2, then declare 1; otherwise, declare 0.

The NRZ decoder 800 includes a delay line 804, a sum block 810, a decision block 806 and an output interface 808. The input bit stream 802 goes down through the delay line 804. The bit samples of the delay line 804 may include three groups: $N_{skip}$, $N_B-2N_{skip}$ and $N_{skip}$ delay elements as shown in FIG. 10. The sum block 810 sums the selected samples. The decision block 806 receives the output of the sum block 810 and ($N_B-2N_{skip}$)/2 and outputs a binary symbol indicating which one of the two inputs is greater. The decision block 806 may include a comparator that compares the two inputs and outputs one (1) if the former (the output of the sum block 810) is smaller than or equal to (or greater than, depending on the embodiment) the latter (($N_B-2N_{skip}$)/2) and zero (0) otherwise. The output interface 808 may periodically output a decoded bit by, for example, using a switch as described above in connection with FIG. 7.

Figure 11:
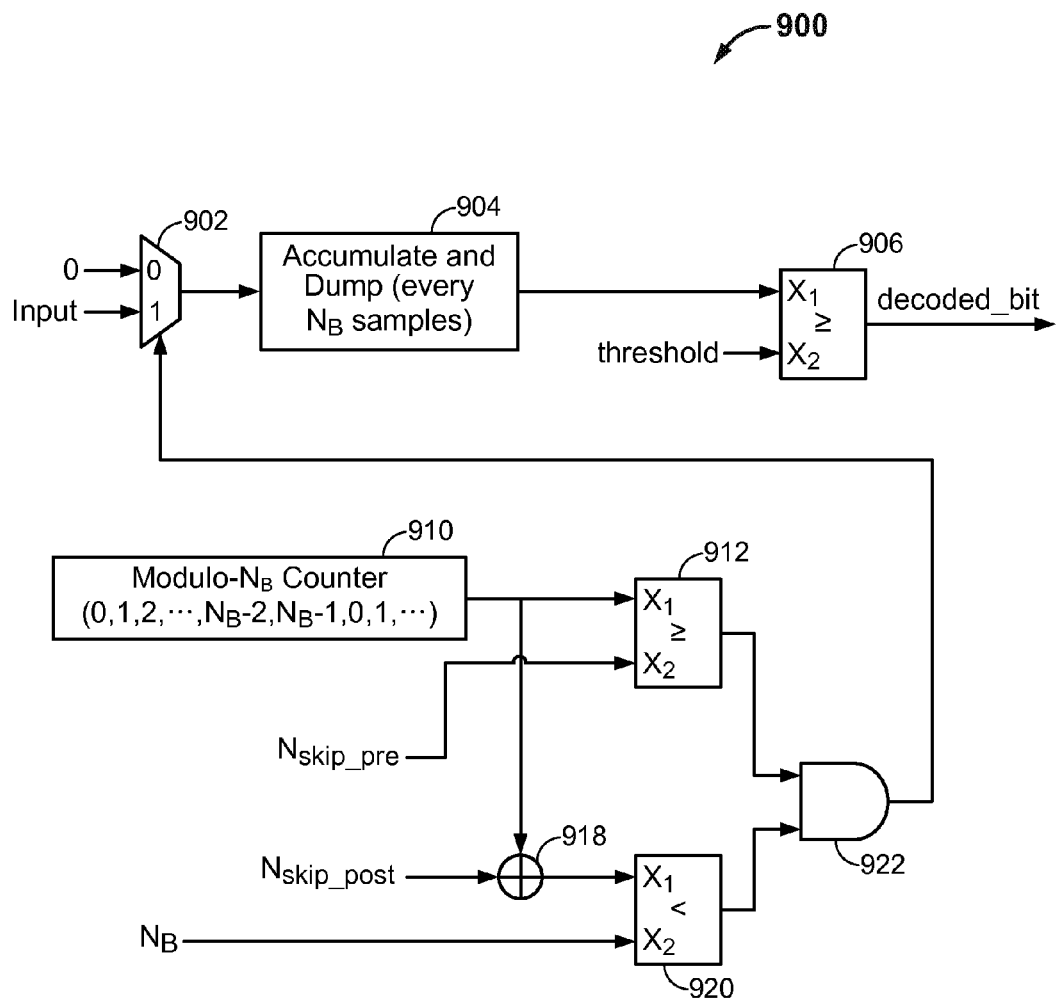
FIG. 11 illustrates a block diagram of an NRZ code decoder according to another embodiment.

FIG. 11 illustrates a block diagram of an NRZ code decoder 900 according to another embodiment. The NRZ code decoder 900 may be more hardware-efficient than the NRZ code decoder 800 of FIG. 10, since the decoder 900 does not include a delay line. In one embodiment, the decoder 900 includes a multiplexer 902, an accumulate-and-dump block 904 and a decision block 906. The decoder 900 may also include a modulo-$N_B$ counter 910, comparators 912 and 920, an adder 918, and a logic gate 922.

The multiplexer 902 receives two inputs (0 and decoder input sample sequence) and outputs one of the two based on a selection signal received from the logic gate 922. The accumulate-and-dump block 904 may accumulate and dump the output of the multiplexer 902. The accumulate-and-dump block 904 may output one sample at the end of each bit duration. The decision block 906 may include a comparator that receives the output of the accumulate-and-dump block 904 and a threshold value and may output, as a decoded bit, one (1) if the former (the output of the accumulate-and-dump block 904) is smaller than or equal to (or greater than, depending on the embodiment) the latter (threshold value) and zero (0) otherwise. The operations of the elements 910-922 are substantially the same as those of the elements 718-730 of FIG. 9, and thus the description thereof will be omitted.

Figure 12:
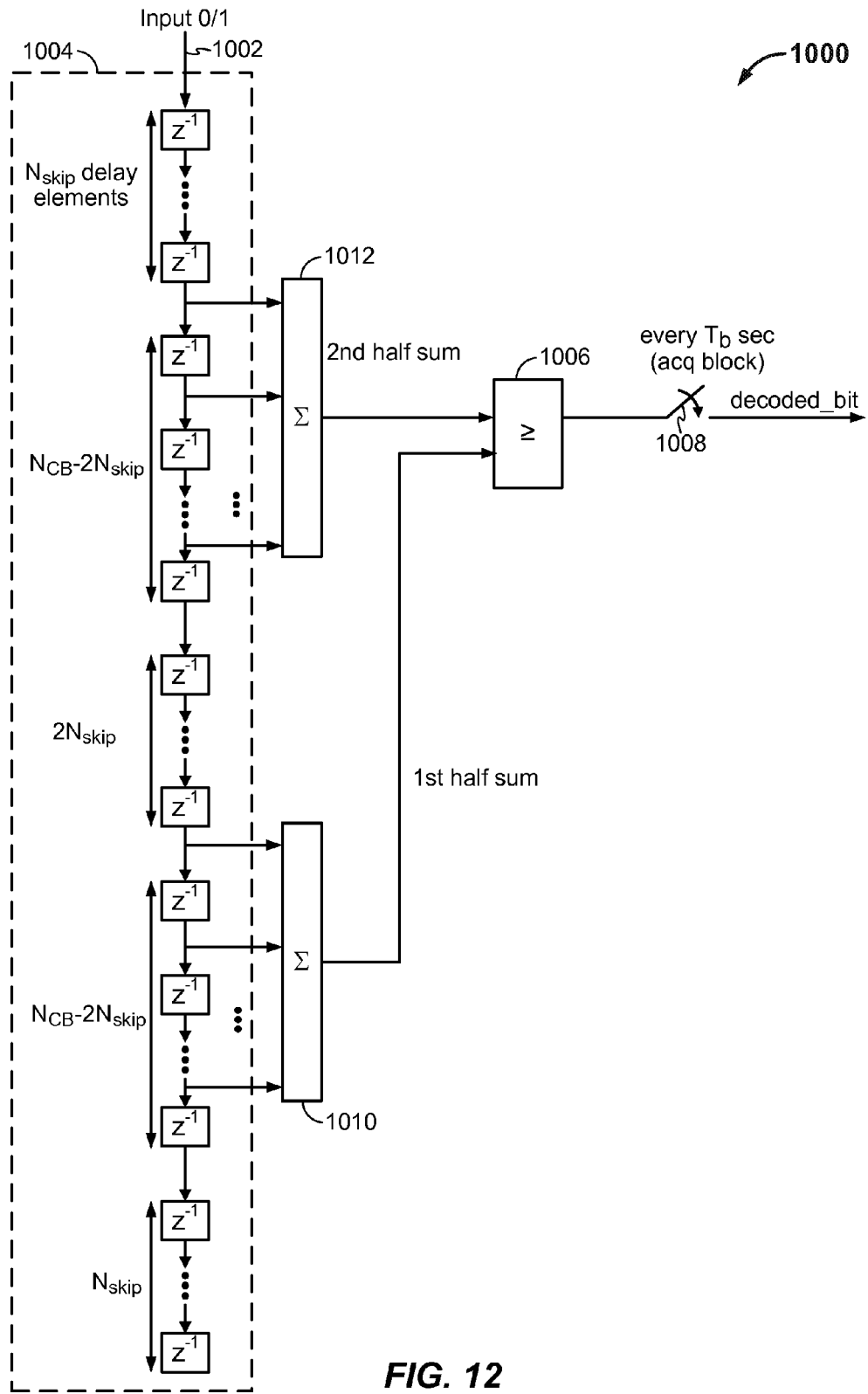
FIG. 12 illustrates a block diagram of a Manchester code decoder according to one embodiment.

FIG. 12 illustrates a block diagram of a Manchester code decoder 1000 according to one embodiment. In some embodiments, depending on a channel and circuit characteristics, the Manchester code decoder 1000 may declare bit 1 if the number of 1's during the first half of a bit duration exceeds the number of 1's during the second half.

The Manchester decoder 1000 may include a delay line 1004, first and second sum blocks 1010 and 1012, a decision block 1006 and an output interface 1008. The input bit stream 1002 goes down through the delay line 1004. The bit samples of the delay line 1004 may include five groups: $N_{skip}$, $N_{CB}-2N_{skip}$, $2N_{skip}$, $N_{CB}-2N_{skip}$ and $N_{skip}$ delay elements as shown in FIG. 12. The Manchester decoder 1000 may select the middle portion of the first half and the middle portion of the second half of an input bit stream. The first sum block 1010 sums the first half of the selected samples. The second sum block 1012 sums the second half of the selected samples. The decision block 1006 receives the outputs of the first and second sum blocks 1010 and 1012, and outputs a binary symbol indicating which one of the two inputs is greater. For example, the decision block 1006 outputs one (1) if the output of the first sum block 1010 is smaller than or equal to (or greater than, depending on the embodiment) the output of the second sum block 1012 and zero (0) otherwise. The output interface 1008 may periodically output a decoded bit by, for example, using a switch as described above in connection with FIG. 7.

Figure 13:
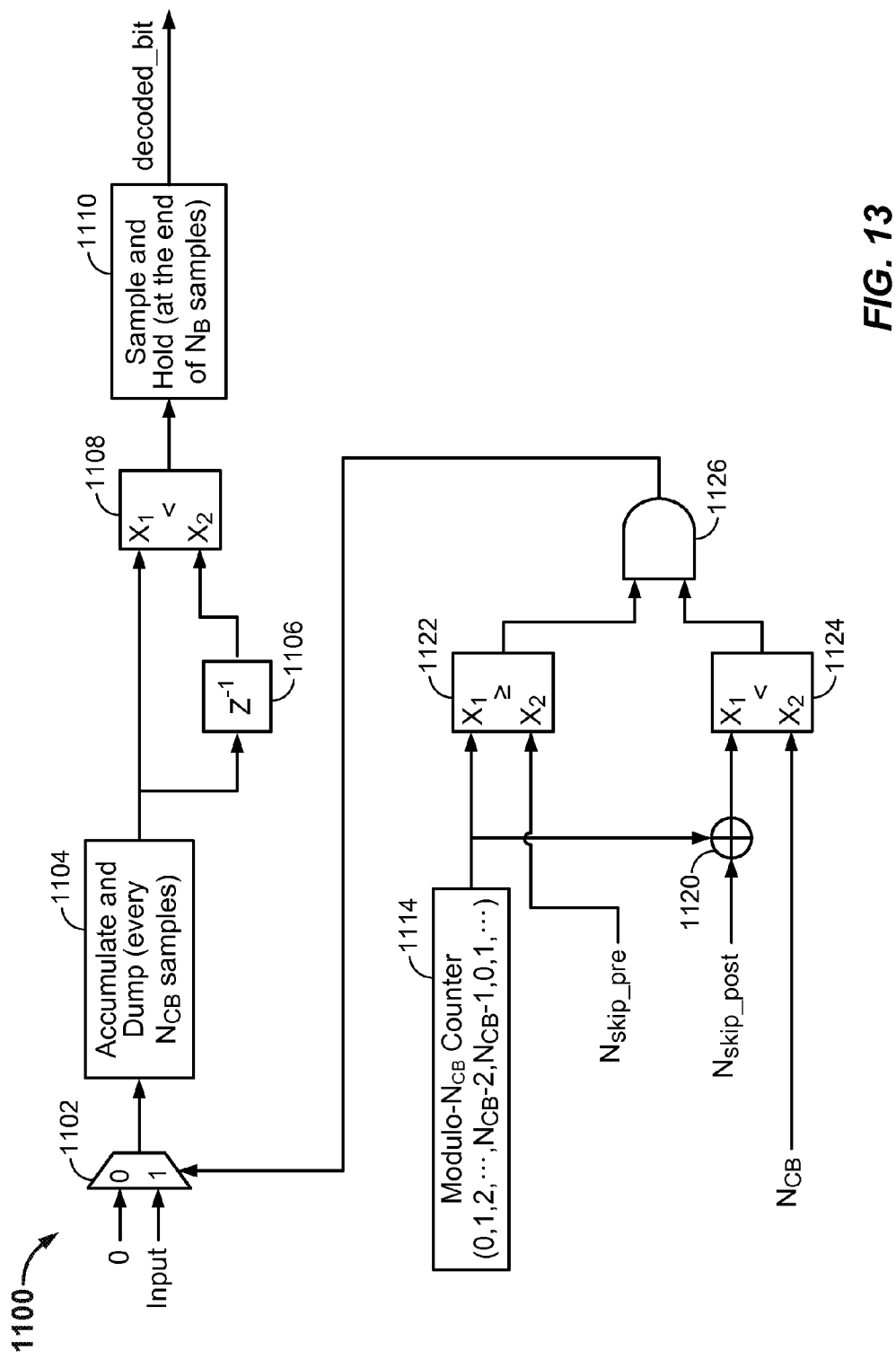
FIG. 13 illustrates a block diagram of a Manchester code decoder according to another embodiment.

FIG. 13 illustrates a block diagram of a Manchester code decoder 1100 according to another embodiment. The Manchester code decoder 1100 may be more hardware-efficient than the Manchester code decoder 1000 of FIG. 12, since the decoder 1100 does not include a delay line. In one embodiment, the decoder 1100 includes a multiplexer 1102, an accumulate-and-dump block 1104, a delay block 1106, a comparator 1108 and a sample-and-hold block 1110. The decoder 1100 may also include a modulo-$N_{CB}$ counter 1114, comparators 1122 and 1124, an adder 1120 and a logic gate 1126.

The multiplexer 1102 receives two inputs (0 and decoder input sample sequence) and outputs one of the two based on a selection signal received from the logic gate 1126. The accumulate-and-dump block 1104 may accumulate and dump the output of the multiplexer 1102. The accumulate-and-dump block 1104 may output one sample at the end of each half of a bit duration. The comparator 1108 receives the output of the accumulate-and-dump block 1104 and the output of the delay block 1106 and may output a binary symbol indicating which one of the two inputs is greater. For example, the comparator 1108 outputs one (1) if the output of the accumulate-and-dump block 1104 is smaller than or equal to (or greater than, depending on the embodiment) the output of the delay block 1106 and zero (0) otherwise. The sampling block 1110 may latch the output of the comparator 1108 at the end of a bit duration and output a decoded bit. The operations of the elements 1114-1126 are substantially the same as those of the elements 718-730 of FIG. 9, and thus the description thereof will be omitted.

Figure 14:
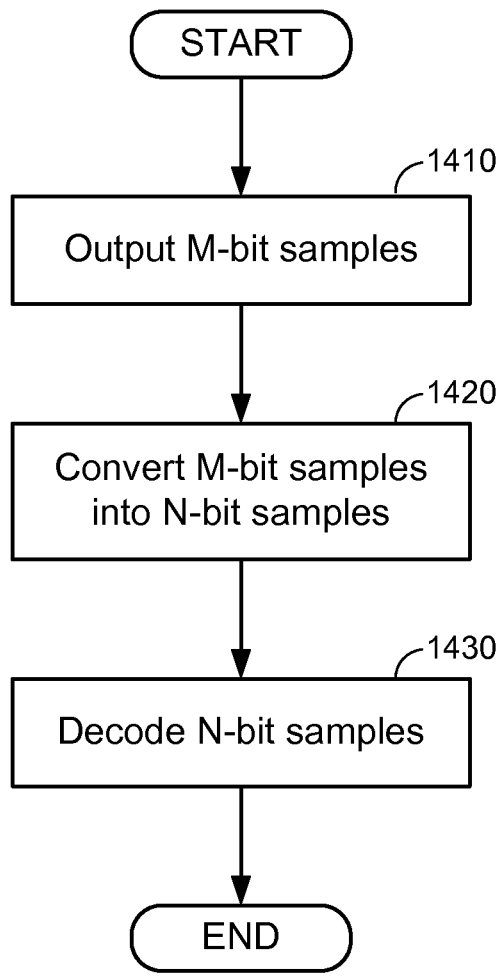
FIG. 14 illustrates a flowchart showing an exemplary operation of the NFC receiver of FIG. 4.

FIG. 14 illustrates a flowchart showing an exemplary operation of the NFC receiver 450 of FIG. 4. Depending on the embodiment, additional states may be added, others removed, or the order of the states may change in FIG. 14. In state 1410, an NFC receiver 450 receives a signal from an NFC transmitter and outputs an input sequence of M-bit samples. In state 1420, the NFC receiver converts the input sequence of M-bit samples into an output sequence of N-bit samples. As discussed above, M and N are positive integer numbers, and M is greater than N. For example, M may be 3 or greater, and N may be 2 or 1. In state 1430, the NFC receiver 450 decodes the output sequence of N-bit samples.

Figure 15:
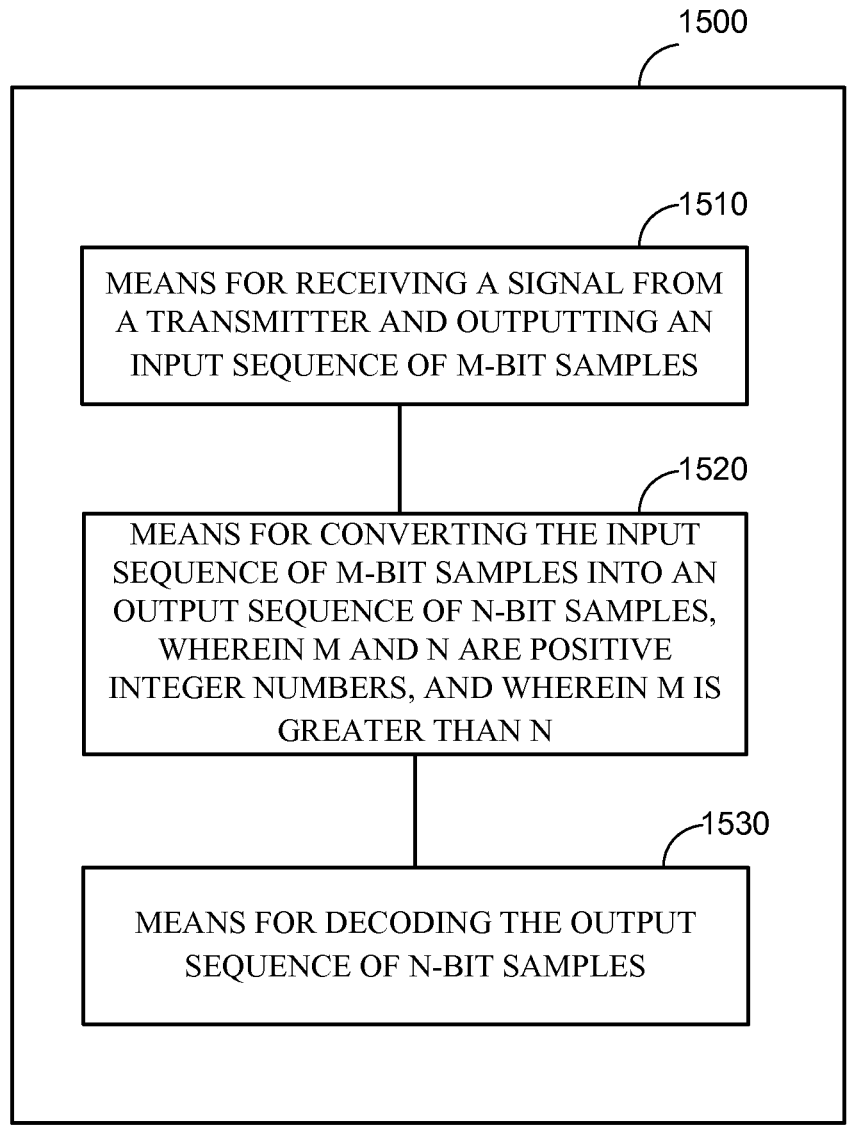
FIG. 15 illustrates an exemplary structure of an NFC receiver according to another embodiment.

FIG. 15 illustrates an exemplary structure of an NFC receiver 1500 according to another embodiment. Depending on the embodiment, certain means may be removed from or additional means may be added to the receiver 1500. Furthermore, two or more means may be combined into a single means, or a single means may be realized as multiple means. The receiver 1500 includes means for receiving and outputting 1510, means for converting 1520 and means for decoding 1530. The receiving and outputting means 1510 receives a signal from a transmitter and outputs an input sequence of M-bit samples. The converting means 1520 converts the input sequence of M-bit samples into an output sequence of N-bit samples. As discussed above, M and N are positive integer numbers, and M is greater than N. The decoding means 1530 decodes the output sequence of N-bit samples.

At least one of the disclosed embodiments reduces hardware complexity of the acquisition and decoder blocks by applying an adaptive slicer before these blocks are run. Compared with the receiver architecture that performs slicing in the RF subsystem, at least one embodiment can achieve better acquisition and error performance because the adaptive slicer in the digital modem can use more sophisticated algorithms to handle signal distortions and noise. Furthermore, decoders according to at least one of the disclosed embodiments may achieve a bit error rate (BER) close to the theoretical limit, but their hardware complexities are very low because the input to the decoder is binary symbols or at most a 2-bit sequence.

The various operations of methods described above may be performed by any suitable means capable of performing the operations, such as various hardware and/or software component(s), circuits, and/or module(s). Generally, any operations illustrated in the Figures may be performed by corresponding functional means capable of performing the operations.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative logical blocks, modules, circuits, and algorithm steps described in connection with the implementations disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. The described functionality may be implemented in varying ways for each particular application, but such implementation decisions should not be interpreted as causing a departure from the scope of the implementations of the application.

The various illustrative blocks, modules, and circuits described in connection with the implementations disclosed herein may be implemented or performed with a general purpose processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm and functions described in connection with the implementations disclosed herein may be embodied directly in hardware, in a software module executed by a processor, or in a combination of the two. If implemented in software, the functions may be stored on or transmitted over as one or more instructions or code on a tangible, non-transitory computer-readable medium. A software module may reside in Random Access Memory (RAM), flash memory, Read Only Memory (ROM), Electrically Programmable ROM (EPROM), Electrically Erasable Programmable ROM (EEPROM), registers, hard disk, a removable disk, a CD ROM, or any other form of storage medium known in the art. A storage medium is coupled to the processor such that the processor may read information from, and write information to, the storage medium. In the alternative, the storage medium may be integral to the processor. Disk and disc, as used herein, includes compact disc (CD), laser disc, optical disc, digital versatile disc (DVD), floppy disk and Blu-Ray disc where disks usually reproduce data magnetically, while discs reproduce data optically with lasers. Combinations of the above should also be included within the scope of computer readable media. The processor and the storage medium may reside in an ASIC. The ASIC may reside in a user terminal. In the alternative, the processor and the storage medium may reside as discrete components in a user terminal.

For purposes of summarizing the disclosure, certain aspects, advantages and novel features of the applications have been described herein. It is to be understood that not necessarily all such advantages may be achieved in accordance with any particular implementation of the application. Thus, the application may be embodied or carried out in a manner that achieves or optimizes one advantage or group of advantages as taught herein without necessarily achieving other advantages as may be taught or suggested herein.

Various modifications of the above described implementations may be readily apparent, and the generic principles defined herein may be applied to other implementations without departing from the spirit or scope of the application. Thus, the present application is not intended to be limited to the implementations shown herein but is to be accorded the widest scope consistent with the principles and novel features disclosed herein.

What is claimed is:

1. A receiver apparatus, comprising:
   a receiver interface configured to receive a signal from a transmitter and output an input sequence of M-bit samples;
   a quantizer circuit configured to convert the input sequence of M-bit samples into an output sequence of N-bit samples, wherein M and N are positive integer numbers greater than zero, and wherein M is greater than N;
   a first circuit configured to generate bit boundary information for the output sequence of N-bit samples; and
   a decoder circuit configured to decode the output sequence of N-bit samples, wherein the decoder circuit comprises:
   a second circuit configured to select a group of the output sequence of N-bit samples based on the bit boundary information; and
   a third circuit configured to decode the selected group of samples.

2. The apparatus of claim 1, wherein M is 3 or greater, and wherein N is 1.

3. The apparatus of claim 1, wherein M is 3 or greater, and wherein N is 2.

4. The apparatus of claim 1, wherein the quantizer circuit is further configured to remove a time-varying DC direct current component from the input sequence of M-bit samples.

5. The apparatus of claim 1, wherein the second circuit comprises:
   a delay line configured to sequentially delay the output sequence of N-bit samples so as to select the group of samples; and
   a sum block configured to calculate a weighted sum of the selected group of samples.

6. The apparatus of claim 5, wherein the sum block is further configured to calculate the weighted sum using the following equation:

$$\log\left(\frac{P(\{x[k]\} \mid \text{bit } 1)}{P(\{x[k]\} \mid \text{bit } 0)}\right) = \sum_{k \in B} Q\left[\log\left(\frac{1-p[k]}{p[k]}\right)\right] - \sum_{k \in A} Q\left[\log\left(\frac{1-p[k]}{p[k]}\right)\right]$$

where x[k], k=0, 1, ..., $N_B$−1, denotes the output sequence of N-bit samples, p[k] represents the probability of error at an index k, A={k|x[k]=a[k]}, B={k|x[k]=b[k]}, a[k] and b[k] denote two ideal quantizer output sequences corresponding to bit 0 and bit 1, respectively, and Q [Y] means a quantized value (0 or 1) of Y.

7. The apparatus of claim 1, wherein the second circuit comprises an accumulator configured to calculate a weighted accumulation of the selected group of samples.

8. The apparatus of claim 7, wherein the accumulator is configured to calculate the weighted accumulation using the following equation:

$$\log\left(\frac{P(\{x[k]\} \mid \text{bit } 1)}{P(\{x[k]\} \mid \text{bit } 0)}\right) = \sum_{k \in B} Q\left[\log\left(\frac{1-p[k]}{p[k]}\right)\right] - \sum_{k \in A} Q\left[\log\left(\frac{1-p[k]}{p[k]}\right)\right]$$

where x[k], k=0, 1, ..., $N_B$−1, denotes the output sequence of N-bit samples, p[k] represents the probability of error at an index k, A={k|x[k]=a[k]}, B={k|x[k]=b[k]}, a[k] and b[k] denote two ideal quantizer output sequences corresponding to bit 0 and bit 1, respectively, and Q [Y] means a quantized value (0 or 1) of Y.

9. The apparatus of claim 1, wherein the decoder circuit comprises a line-code decoder.

10. The apparatus of claim 9, wherein the line-code decoder comprises at least one of the following: a modified-Miller code decoder, a non-return-to-zero (NRZ) code decoder and a Manchester code decoder.

11. The apparatus of claim 1, wherein the receiver interface comprises:
   a receiver circuit configured to wirelessly receive a line-coded analog signal according to a near field communication (NFC) standard; and
   an analog to digital converter configured to convert the analog signal into the input sequence of M-bit samples.

12. The apparatus of claim 11, wherein the receiver interface further comprises:
   an envelope detector configured to demodulate the line-coded analog signal; and
   a low pass filter configured to reduce carrier signal ripples and high frequency noise from the demodulated signal and provide the filtered signal to the analog to digital converter.

13. The apparatus of claim 1, wherein the quantizer circuit comprises an adaptive slicer configured to convert the input sequence of M-bit samples into the output sequence of N-bit samples and remove a time-varying direct current component from the input sequence.

14. The apparatus of claim 13, wherein M is 3 or greater, and wherein N is 2 or 1.

15. A method of processing a signal in a receiver apparatus, comprising:
   receiving a signal from a transmitter and outputting an input sequence of M-bit samples;
   converting the input sequence of M-bit samples into an output sequence of N-bit samples, wherein M and N are positive integer numbers greater than zero, and wherein M is greater than N;
   decoding the output sequence of N-bit samples; and
   generating bit boundary information for the output sequence of N-bit samples;
   wherein the decoding comprises:
   selecting a group of the output sequence of N-bit samples based on the bit boundary information; and
   decoding the selected group of samples.

16. The method of claim 15, wherein M is 3 or greater, and wherein N is 1 or cm 2.

17. One or more non-transitory processor-readable storage devices having processor-readable code embodied on the processor-readable storage devices, the processor-readable code for programming one or more processors to perform a method of processing a signal in a receiver apparatus, the method comprising:
   receiving a signal from a transmitter and outputting an input sequence of M-bit samples;
   converting the input sequence of M-bit samples into an output sequence of N-bit samples, wherein M and N are positive integer numbers greater than zero, and wherein M is greater than N;
   decoding the output sequence of N-bit samples; and
   generating bit boundary information for the output sequence of N-bit samples;
   wherein the decoding comprises:
   selecting a group of the output sequence of N-bit samples based on bit boundary information by sequentially delaying the output sequence of N-bit samples; and
   calculating a weighted sum of the selected group of samples.

18. The storage devices of claim 17, wherein M is 3 or greater, and wherein N is 1 or 2.

19. The storage devices of claim 17, wherein the weighted sum is calculated using the following equation:

$$\log\left(\frac{P(\{x[k]\} \mid \text{bit } 1)}{P(\{x[k]\} \mid \text{bit } 0)}\right) = \sum_{k \in B} Q\left[\log\left(\frac{1-p[k]}{p[k]}\right)\right] - \sum_{k \in A} Q\left[\log\left(\frac{1-p[k]}{p[k]}\right)\right]$$

where $x[k]$, $k=0, 1, \ldots, N_B-1$, denotes the output sequence of N-bit samples, $p[k]$ represents the probability of error at an index $k$, $A=\{k \mid x[k]=a[k]\}$, $B=\{k \mid x[k]=b[k]\}$, $a[k]$ and $b[k]$ denote two ideal quantizer output sequences corresponding to bit 0 and bit 1, respectively, and $Q[Y]$ means a quantized value (0 or 1) of Y.

20. A receiver apparatus, comprising:
means for receiving a signal from a transmitter and outputting an input sequence of M-bit samples;
means for converting the input sequence of M-bit samples into an output sequence of N-bit samples, wherein M and N are positive integer numbers greater than zero, and wherein M is greater than N;
means for decoding the output sequence of N-bit samples; and
means for generating bit boundary information for the output sequence of N-bit samples;
wherein the means for decoding comprises:
means for selecting a group of the output sequence of N-bit samples based on bit boundary information by sequentially delaying the output sequence of N-bit samples; and
means for calculating a weighted sum of the selected group of samples.

21. The apparatus of claim 20, wherein the receiving means comprises a receiver interface.

22. The apparatus of claim 20, wherein the converting means comprises a quantizer circuit.

23. The apparatus of claim 20, wherein the decoding means comprises a decoder circuit.

24. A processing apparatus, comprising:
a memory; and
a processor coupled to the memory, the processor configure to
receive a signal from a transmitter and output an input sequence of M-bit samples,
convert the input sequence of M-bit samples into an output sequence of N-bit samples, wherein M and N are positive integer numbers greater than zero, and wherein M is greater than N,
decode the output sequence of N-bit samples; and
generate bit boundary information for the output sequence of N-bit samples;
wherein the decode comprises:
selecting a group of the output sequence of N-bit samples based on bit boundary information by sequentially delaying the output sequence of N-bit samples; and
calculating a weighted sum of the selected group of samples.

\* \* \* \* \*